Dec. 23, 1924.
J. L. ANDERSON
1,520,271
TUBE WELDING MACHINE
Filed Dec. 5, 1919      6 Sheets-Sheet 6
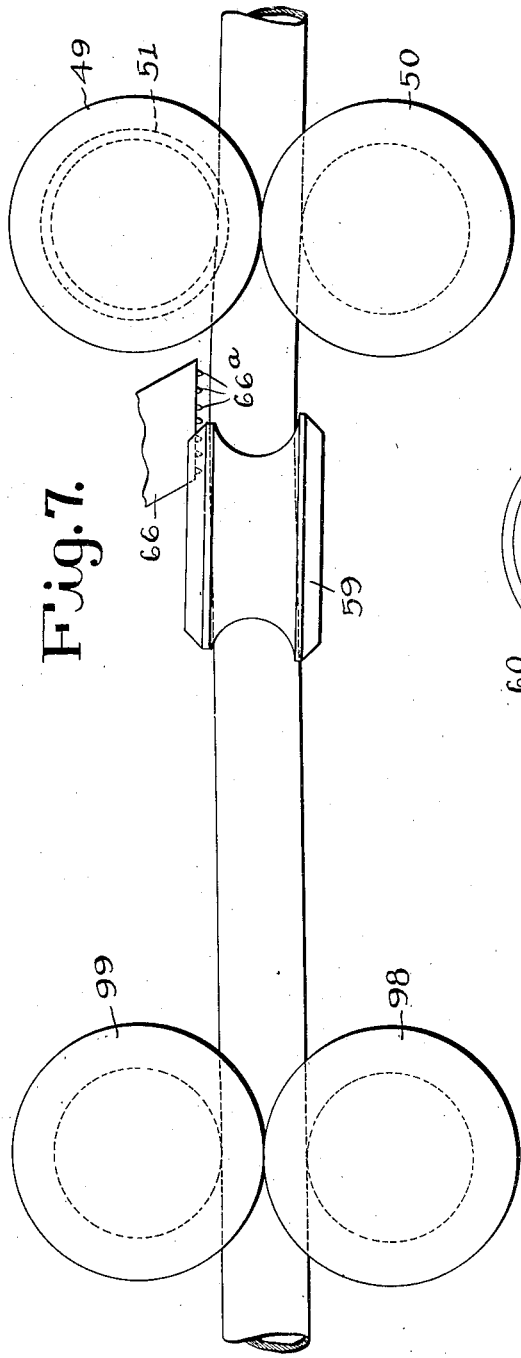
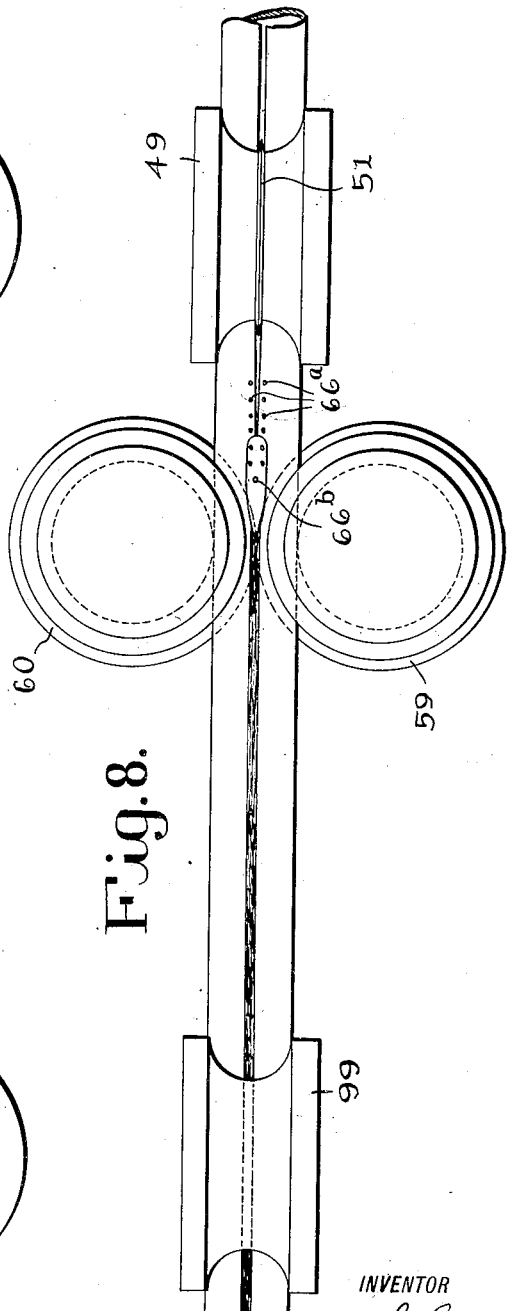
INVENTOR
James L. Anderson
BY
ATTORNEY Patented Dec. 23, 1924.

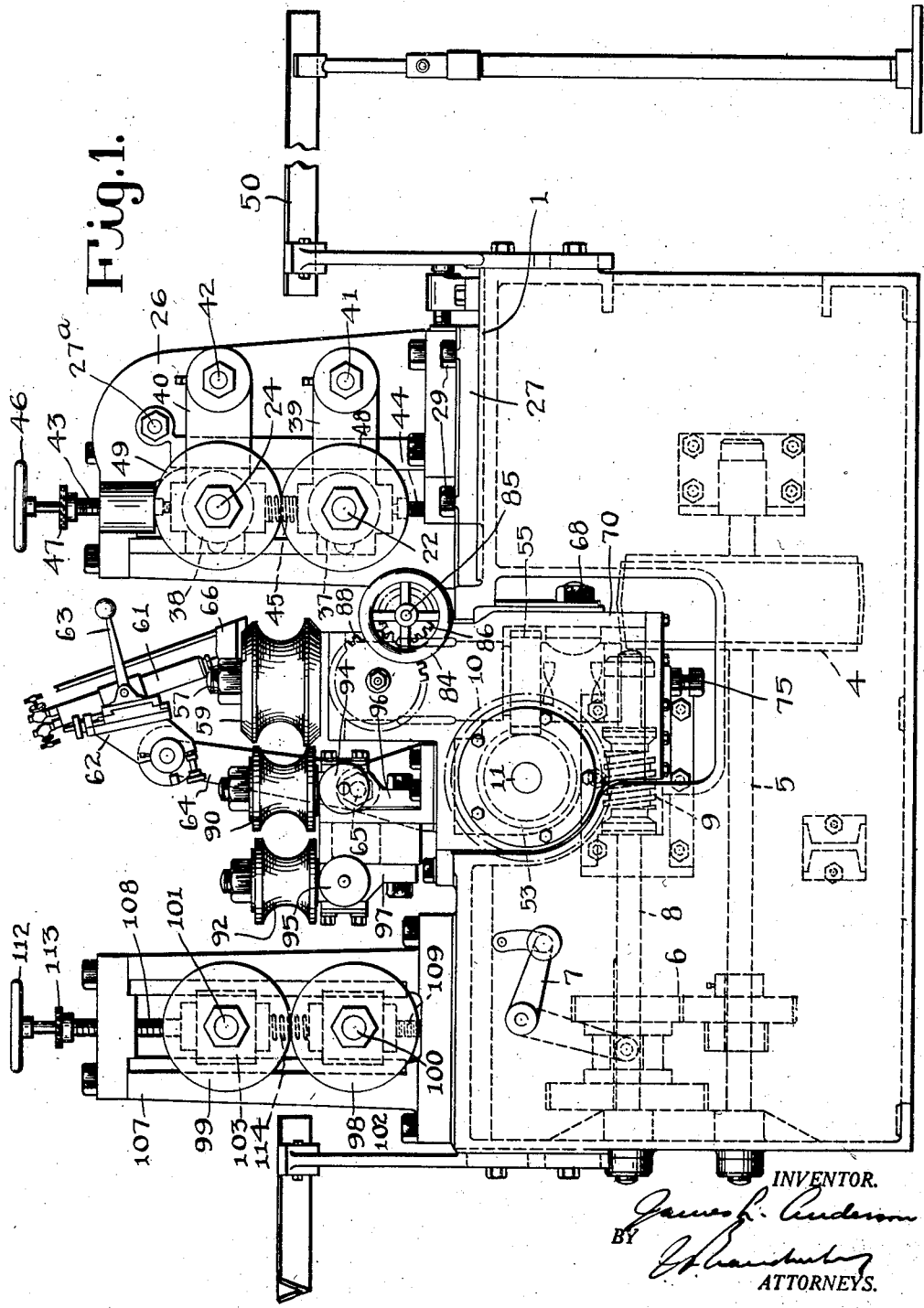

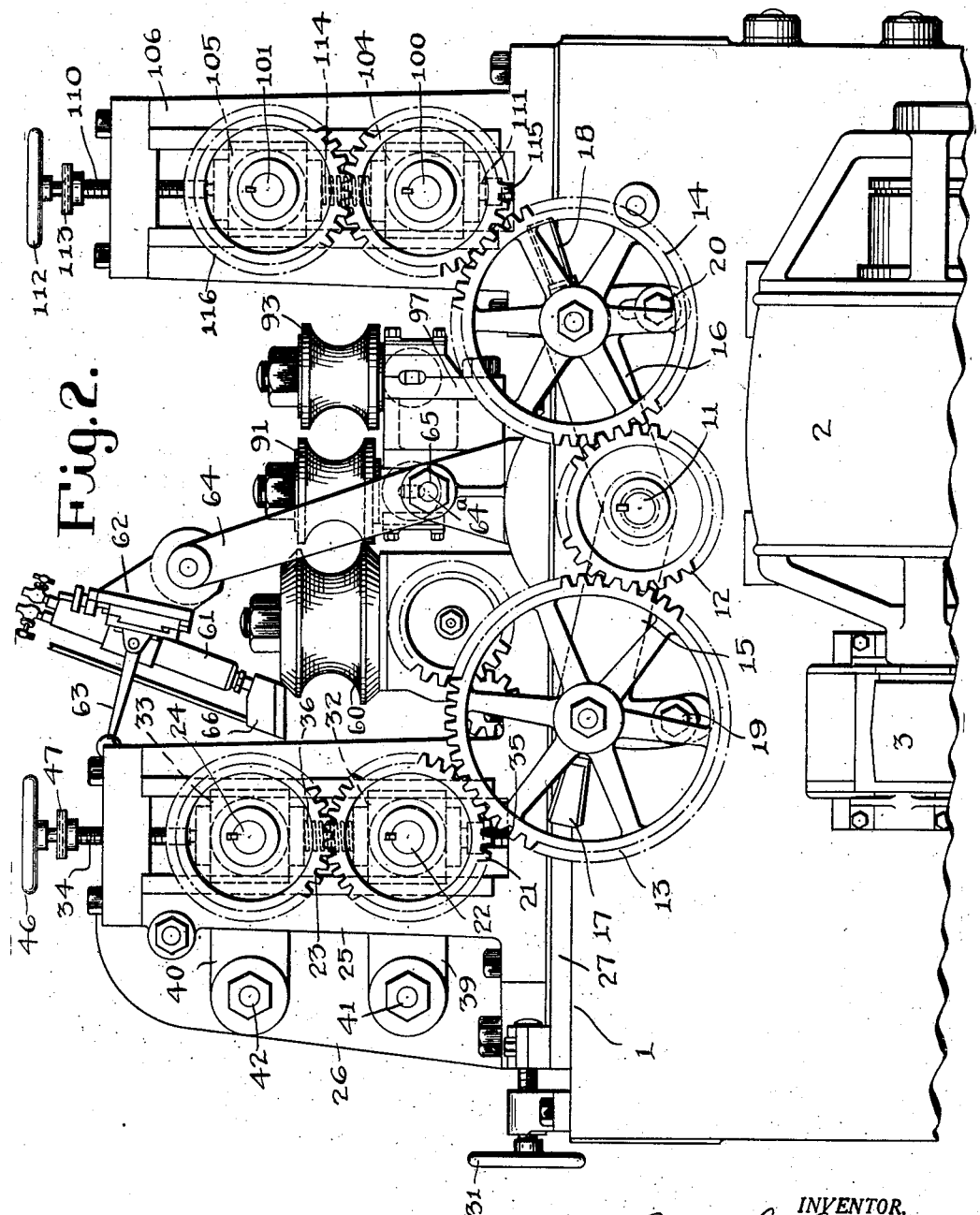

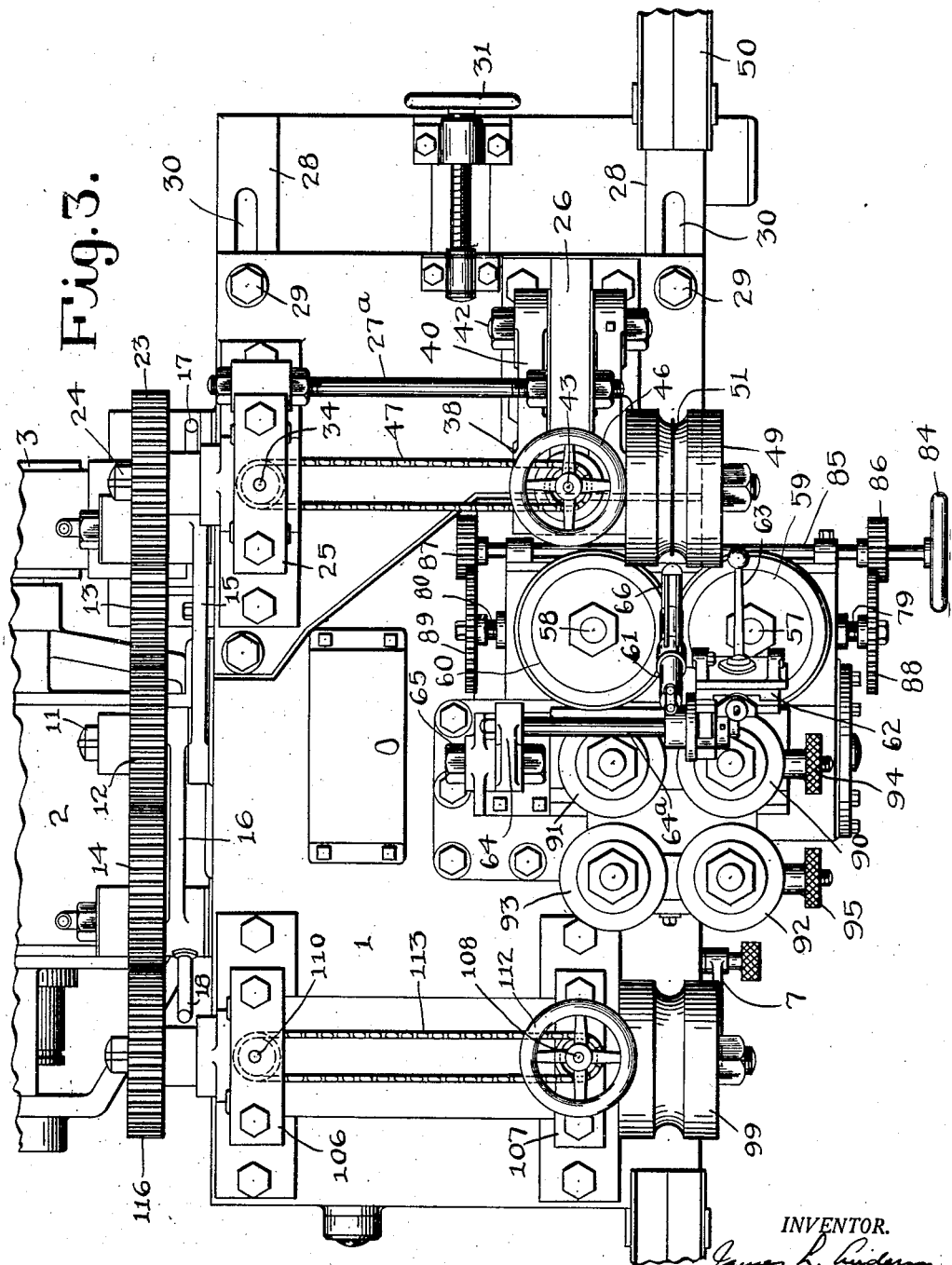

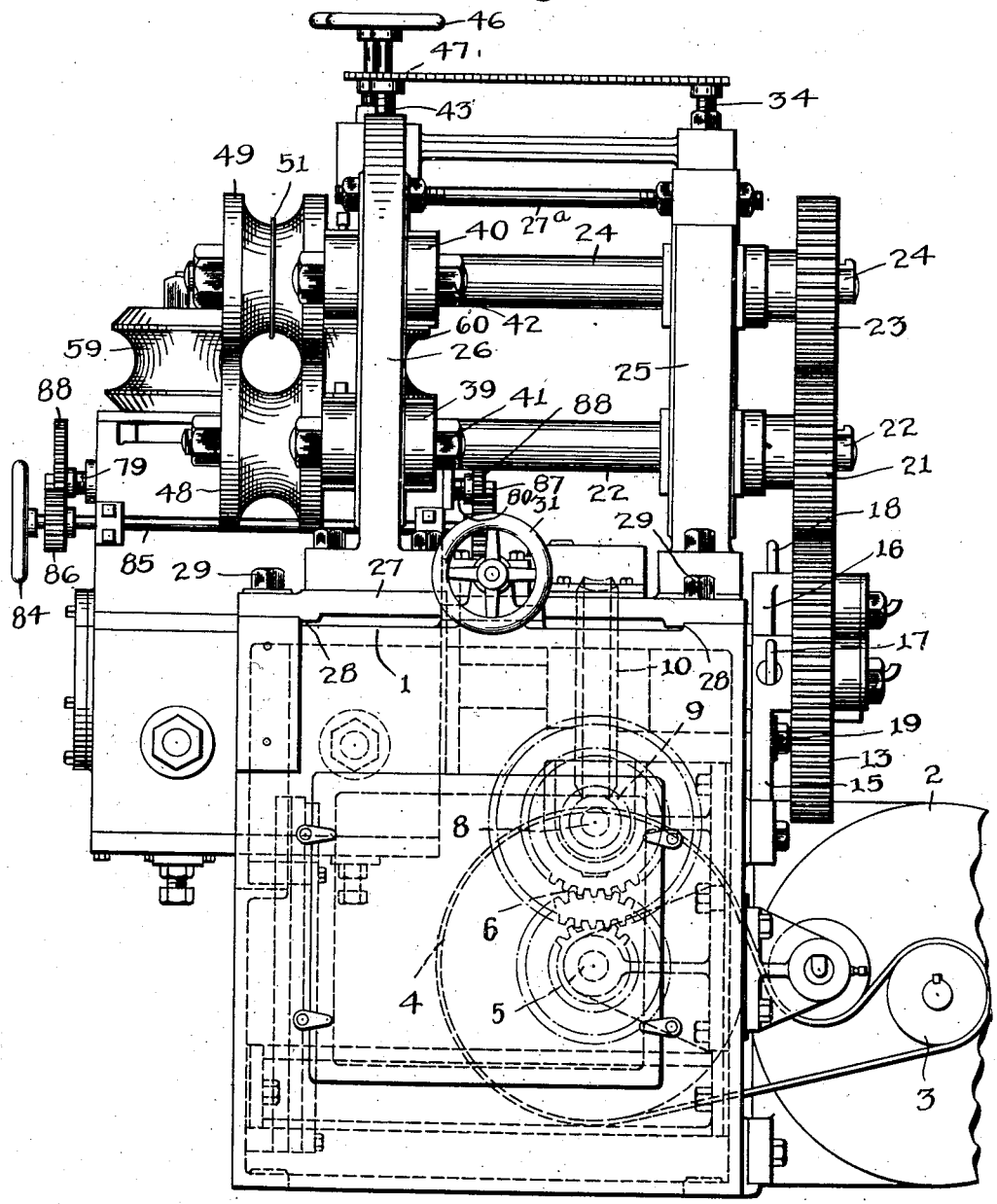

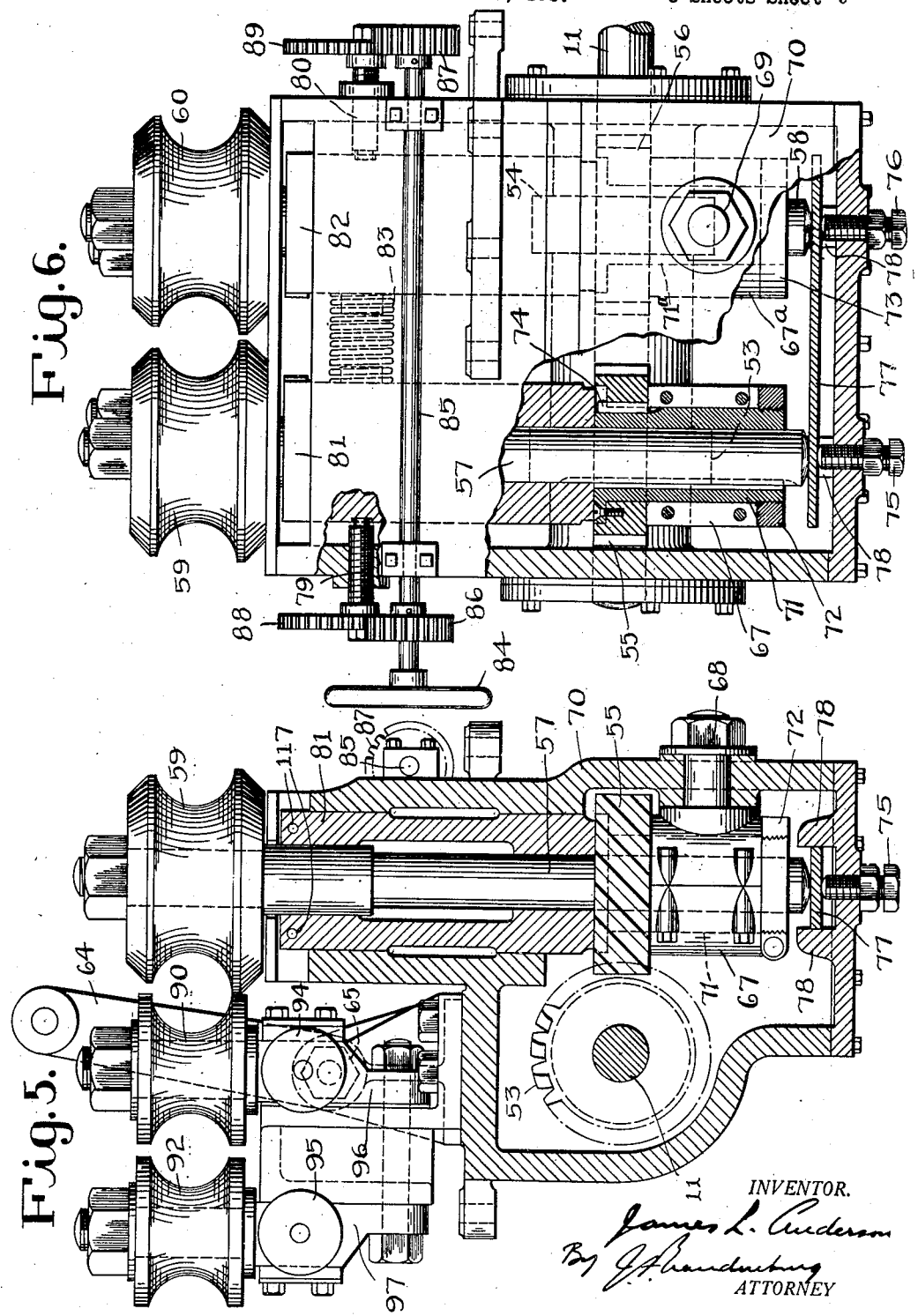

1,520,271

UNITED STATES PATENT OFFICE.

JAMES L. ANDERSON, OF BAYONNE, NEW JERSEY, ASSIGNOR, BY MESNE ASSIGNMENTS, TO AIR REDUCTION COMPANY, INCORPORATED, OF NEW YORK, N. Y., A CORPORATION OF NEW YORK.

TUBE-WELDING MACHINE.

Application filed December 5, 1919. Serial No. 342,769.

*To all whom it may concern:*

Be it known that I, JAMES L. ANDERSON, a citizen of the United States, and resident of Bayonne, in the county of Hudson and State of New Jersey, have invented a new and useful Tube-Welding Machine, of which the following is a specification.

The invention relates to tube welding, and more particularly to that art of welding wherein the longitudinal seam is progressively closed by fusion in traveling uninterruptedly past an intense flame or other suitable heating agency, and the object is to provide apparatus and method whereby a large output of good quality is obtained and imperfect welds and scrap are minimized, and whereby comparatively large diameter and heavy gage tubing can be successfully and rapidly welded. Heretofore in welding tubing with the oxyacetylene flame there has been a large amount of waste and defective welds, and the difficulty has been practially prohibitive in the large and heavier gages. The invention comprises certain novel matters of machine and procedure, making possible superior results with heavier as well as lighter tubing, which will become apparent as the specification proceeds. The machine is also capable of use at still higher speeds for pressure butt-welding, in which the seam edges of the traveling tube are highly heated by the flame while separated and without flowing together in an autogenous union, and are united at a subsequent point by transverse compression.

In the accompanying drawings, forming a part hereof:

Fig. 1 is a side elevation of the machine;

Fig. 2 is a side elevation looking at the other side, showing the torch in a shifted position;

Fig. 3 is a plan view with parts at one side broken away and showing the large grooved rolls of Figs. 1 and 2 replaced with small grooved rolls for a smaller size of tubing and the guide rolls at the entering end adjusted close to the pressure rolls;

Fig. 4 is a front end elevation;

Fig. 5 is a vertical longitudinal section taken in the plane of the axis of the pressure roll 59;

Fig. 6 is a front elevation, partly broken away and in section, of the part of the frame carrying the primary and secondary compression rolls;

Fig. 7 is a schematic view, somewhat exaggerated illustrating operation; and

Fig. 8 is a plan view corresponding to Fig. 7.

A horizontally enlongated main frame or table 1 is provided. Power is supplied from a motor 2 or other suitable external source through a driving pulley 3, which is belted to a pulley 4 within the frame. The shaft 5 of this pulley drives through a suitable change-speed gearing 6, controlled by shift lever 7, to another longitudinal shaft 8. On this shaft is a worm 9 meshing with a worm wheel 10 on a transverse shaft 11. Said shaft bears at one end, at one side of the frame, a gear 12, which meshes with idler gears 13 and 14, carried by swinging arms 15 and 16, angularly adjustable by handles 17 and 18 and held in any desired positions by locking means 19 and 20.

The idler 13 meshes with a gear 21 on a transverse shaft 22 on the lower part of a stand on top of the main frame at the feeding-in end of the machine, said gear meshing with another gear 23 on the upper shaft 24 in the same stand.

Said stand comprises two side uprights 25 and 26, tied by a cross-rod 27ª, on a base 27, which is slidable longitudinally on ways 28 on the frame, whereby a carriage is obtained which is held to the frame by bolts 29 operating in longitudinal slots 30. The carriage is movable forwardly and rearwardly by a screw 31.

The standard 25 is vertically slotted, and in it are vertically slidable bearings 32 and 33 for the shafts 22 and 24. A screw 34 is arranged to bear downward upon the upper of these bearings, and a screw 35 is disposed to bear upward against the bottom one, a spring 36 being interposed between, whereby the shafts can be vertically adjusted.

The remote portions of said shafts are journaled in bearings 37, 38, which are carried on the free ends of arms 39, 40, which project rearward from transverse forward pivots 41, 42 on the standard 26, said arms being preferably bifurcated as shown to embrace the standard. Screws 43, 44 and a spring 45 are provided in connection with these bearings for the same purpose as those just described in connection with the slidable bearings at the other side. A common hand-wheel 46 and a sprocket connection 47 may be provided for simultaneously operating the screws.

On the ends of the horizontal shafts 22, 24, outside the arms 39, 40, are driven feeding and guiding rolls 48, 49, grooved as usual to conform to the tubing, which is pushed by hand into their embrace from a feed trough 50. The upper roll 49 is split in a well-known manner, to contain a circular fin 51 constituting a revoluble guide adapted to cooperate with the open seam of the formed tube blank. The feed rolls and guide fin are movable longitudinally of the machine, as hereinafter described, and this movement, as also their vertical movement, is accommodated by the swinging arm 15 and idler 13 of the driving mechanism.

The transverse shaft 11 heretofore referred to also bears a pair of spiral or skew gears 53, 54, which mesh with similar gears 55, 56 on generally vertical shafts 57, 58 in the frame. Said shafts at their upper ends bear grooved driven rolls 59, 60, which hold the tube beyond the region of fusion and by which compression can be exerted to squeeze up the metal to strengthen and thicken the weld, as has long been well known. For convenience these rolls will be termed the pressure rolls.

An oxyacetylene or like welding torch 61 is supported on a suitable bracket 62 providing for vertical and transverse movement by a handle 63, preferably as disclosed in my copending application filed September 3, 1919, Serial No. 321,301, the bracket being mounted on a transverse rod 64ª on the upper end of an upstanding swinging arm 64, the lower end of which is friction pivoted at 65 on the frame below the rolls 59, 60, so as to be capable of movement forward and rearward to permit adjustment of the torch relatively to the rolls lengthwise of the course of the tube. The tip 66 of the torch is elongated lengthwise of the seam, and preferably constructed in accordance with my application Serial No. 317,282, filed August 13, 1919, for performing the method of spread flame welding disclosed in my application Serial No. 317,281, filed August 13, 1919. A typical arrangement of the jets is shown in Fig. 8, wherein are seen two transversely spaced rows of jet orifices 66ª, forming the ends of delivery passages which are supplied with the oxyacetylene mixture. These jets are back of the seam edges in the manner set forth in my said application Serial No. 317,281, while the compound envelope surrounds a substantial length of the tube and through the crack fills the interior. One or more central leveling jets 66ᵇ may advantageously be employed at the rear, in the manner and for the purpose described in my applications for improvements in torch and method Serial Nos. 342,770 and 342,768 filed December 5, 1919.

In operation the torch-holder is adjusted so that the intense heat of the flame strikes the tube in advance of the point of holding or pressure, which is between the centers of the rolls 59, 60. It has been proposed to fuse directly between the rolls, water-cooling the latter to save them from the heat, so that the heating is narrowly localized and each successive point of the seam is fused and congealed practically at once. Under such conditions much of the heat is lost and there is danger of the seam opening up after leaving the rolls, whereas by fusing in advance of the rolls and heating the section of the tube more generally, as is accomplished particularly with the spread-flame welding tips and method of my applications aforesaid, these difficulties are avoided and greater speeds can be attained. The distance from the fusing to the holding or pressure point is variable according to conditions, for example, the diameter and gage of the tube, the material and previous treatment, the speed of welding, and whether an upset or smooth weld is desired. For small, light tubing the distance should be less and for larger and heavier tubing it should be greater. If thickening of the weld is desired the point of heating should be near enough to the centers of the rolls to permit the metal to arrive in a favorable condition for compression; while if a smooth weld is the object the torch should be disposed sufficiently ahead to allow the seam to set practically completely before coming to the rolls. In general the distance should not be less than will permit the fused metal to cool to the critical temperature at which it regains its strength, so that the closed seam will have sufficient resistance to hold it against opening under the spring of the section upon leaving the confinement of the rolls. The self-holding swinging arm 64 affords a substantial range of longitudinal adjustment and is instantly and easily shiftable. By heating in advance of the rolls water-cooling of the same is avoided. Instead, it is advantageous to cool the bearings moderately as by means of channels 117 in the boxes 81, 82 hereinafter referred to (see Fig. 5), thereby preserving the lubricant without affecting the welding.

The shafts 57, 58 of the pressure rollers 59, 60 pass through lower bearings 67, 67ª, which are supported by pivots 68, 69 in a portion 70 of the main frame, the axes of the pivots being parallel with the longitudinal course of the tube. Said frame portion is shown made for convenience as a separate box set into a recess in the main frame and bolted thereto, but this may be varied. The gears 55, 56 have sleeves 71. 71ª united therewith and extending rotatably down through the bearings, beneath which they receive lock collars 72, 73 whereby the gears are held to the bearings while rotatable thereon. The shafts 57, 58 have slidable driven engagement in the gear sleeves by virtue of keys 74, in order that the shafts, and therefore the rolls 59, 60 may be adjusted vertically either equally and in the same sense, or relatively to each other, such adjustment being irrespective of the angular adjustment of the bearings and shafts. This capacity for independent vertical adjustment is important as it is common for the initial tubing to be formed with its edges out of alinement, or one above the other, which by this means can be corrected. The vertical or longitudinal adjustment of the shafts is effected by accessible bottom screws 75, 76, which preferably act upon the lower ends of the shafts through a plate 77 lying between lugs 78, so that the rotation of the shafts does not act upon the screws. The nature of the meshing gears 53, 54, 55, 56 is such that slight relative angular and lateral movement does not interfere with the drive.

The shafts 57, 58 and rolls 59, 60 are movable toward each other, and rigidly sustained at any desired distance apart, by screws 79, 80 threaded through opposite sides of the frame portion 70 to bear against boxes 81, 82 of rectangular cross-section, formed internally with bearings for the parts of the shafts 57, 58 above the gears 55, 56. Said boxes rest upon the gears and are guided between opposing faces in the frame in respect to the lateral tilting movement.

A spring 83 between the boxes serves to move the shafts and rolls apart when the screws are eased off. The screws are desirably operated by a common hand-wheel 84 and transverse shaft 85, said shaft bearing pinions 86, 87, which mesh with gears 88, 89, on the screws, the pinions being sufficiently wide to allow for the longitudinal movement of the gears with the screws.

The pressure rolls can be adjusted and held at a separation at which they will hold the tube against the lateral expansion of the metal, or they can be moved closer together so as further to compress the welded seam. The fact that they are supported on the separate spaced pivots 68, 69 causes the compression to take effect mainly above the horizontal diameter of the tube, the result of which is that the seam, instead of being pinched up as has commonly been the case, is held together in somewhat flattened relation. This produces a better butt-weld; and the slight flattening of the tube along the seam is more easily and safely removed by the subsequent sizing rolls than the pinched up seam of inferior strength.

A further feature of the invention is the provision of means whereby the feeding and seam-guiding means, constituted by the pair of driven horizontal axis rolls 48, 49 and the revoluble fin 51 can be brought as near the welding point as the dimensions of the tube, the size and position of the torch, and the heating conditions will permit. This is accomplished in the herein preferred embodiment by means of the slidable carriage 25, 26, 27 movable to shift the guide rolls and fin longitudinally and in a range adjacent the vertical axis or pressure rolls, and further by the projecting arm supports 39, 40 for the horizontal shafts 22, 24, which permit the feed rolls to be brought into close proximity to the pressure rolls. The several rolls are interchangeable, by removing their nuts, with rolls having larger or smaller grooves, for tubing of different sizes, and the torch tip is also changeable with others of different powers and sizes. For any given set of conditions there is a degree of approach between the planes of the axes of the two sets of rolls, with the welding flame between them, which will give best results, and these results will be materially better than are obtainable if the spacing is somewhat greater. This is due to the fact that almost all formed tubing has a greater or less amount of wind or twist, which is variable, so that the open seam at a distance from the guide does not run true or constant, and consequently the weld is likely to be imperfect owing to the difficulty of keeping the flame on the seam. This difficulty is largely removed by reducing the extent of travel of the open seam from the revolving feed rolls and fin to the flame to the minimum consistent with any operating condition within the range of the machine. For larger and heavier tubing the distance must be comparatively greater, and for smaller and lighter tubing it can be less, up to a condition in which the rolls overlap.

Directly in rear of the pressure rolls 59, 60, are one or more pairs of secondary compression rolls 90, 91, 92, 93, not driven, on vertical axes, and adapted to be squeezed toward each other upon the tube by screws 94, 95. These rolls are carried by removable stands 96, 97, and their use is optional.

After leaving the secondary compression rolls, if present, the welded tubing passes between a pair of grooved sizing rolls 98, 99, on the ends of horizontal shafts 100, 101. The use of these rolls is familiar in the art, the grooves being so formed that when the rolls are set with their edges in contact or substantially in contact the passage provided is of the reduced diameter desired for the finished tubing.

The shafts 100, 101 are journaled in bearings 102, 103, 104, 105 slidable in vertically slotted standards 106, 107 on the main frame, the bearings being acted upon by upper and lower screws 108, 109, 110, 111, with hand-wheel 112 and sprocket 113, and by interposed springs 114, so that the rolls can be separated or brought together, or moved vertically as an assemblage. Said shafts are driven in any of the positions to which they may be adjusted through the shiftable idler 14, which meshes with a gear 115 on the lower shaft, meshing in turn with a gear 116 on the upper shaft.

The several sets of rolls or holding devices through which the tube passes, it will be observed, are represented out of horizontal alinement. This is for the purpose of causing the tube to travel in an arched or bent course while being acted upon, the bending being of such magnitude and location as to introduce a new condition of welding, by virtue of which the longitudinal heat expansion in the upper part of the tube is neutralized, and the contraction, which is greater than the expansion, is utilized to straighten tube. Neutralizing the heat expansion avoids opening of the seam, and as herein effected causes the seam edges to be presented in truer abutment for welding; and the final result is a welded tube which is not only straight but characterized by a condition of slight compression, as against a condition of tension, which exists in tubing welded in the ordinary way. Bowing of the tube can be effected by setting the pressure rolls 59, 60 on vertical axes above the level of the feeding and sizing rolls 48, 49 and 98, 99 on horizontal axes, but for my purposes is best accomplished by disposing the rolls 98, 99, that is to say the center of the passage through them, below the passages through the rolls 48, 49 and 59, 60, these being approximately on a level. The secondary compression rolls 90—93 will be set at appropriate intermediate levels, which can be done by inserting or removing shims beneath them, or these rolls can be omitted entirely, as indicated in the schematic view of Figs. 7 and 8. The extent of the drop in the course of the tube in passing through the relatively long stretch from the pressure to the sizing rolls will vary to some extent with the size and gage of the tube being welded and the distance of the welding flame in advance of the compression rolls; but such descent is contemplated as will cause the tube, fulcruming upon the lower portions of the grooves in the rolls 59, 60, to arch upwardly in front of these rolls and beneath the flame in a greater bow than would otherwise result from expansion due to heat. This is illustrated in a somewhat exaggerated and schematic manner in Fig. 7.

To explain more particularly, the heating of the upper part of the tube by the preheating and welding jets causes expansion, which normally causes the tube to bow. If this bowing is resisted by reason of the rolls all being set in alinement, as can be done through the adjusting devices, there is a tendency for the tube seam to open up in the vicinity of the welding flame, in order to relieve the expansion pressure. The heat also releases the compression strains resulting from the rolling operation by which the tube was formed, and allows the opening of the seam. The principle here involved is to anticipate this bowing effect due to heat, by imposing a greater bow than would naturally occur, and thereby neutralizing the longitudinal expansion effect, as stated. Using the pressure or holding rolls as a fulcrum causes the crown of the arc to be ahead of the centers of these rolls, and has the effect of bringing the seam edges close together by lateral expansion of the metal and the transverse flattening due to bending, and the action of the tops of the grooves in gathering in the edges. The welding operation performed on a tube bowed as described produces a practically straight tube in the final product, and results in the metal of the weld being in better condition to resist the strains of future mechanical operations, because it is left under slight longitudinal compression instead of tension as in the ordinary method now in use.

As heretofore indicated the machine can also be operated in a manner to produce the butt-weld by pressure rather than by fusion. In such case the rolls are driven at higher speeds, the torch is set farther ahead of the pressure rolls 59, 60 where the seam is well open, and the transverse pressure devices are adjusted to give sufficient compression to unite the highly heated edges. The edges may be heated to incipient melting, or to a lesser degree, but do not flow together in the cast union which is produced in the other mode of welding.

Various other modifications may be introduced in the practice of the invention, and I do not limit myself to the use of the gas torch as other agencies may be employed for highly heating the seam edges.

What I claim as new is:

1. In a tube-welding machine, the combination of a main frame, welding means thereon, a pair of rolls on vertical axes in said frame for receiving the tube after passing the welding means, a stand longitudinally guided on the frame, means for shifting the stand, a pair of feed rolls on horizontal axes on said stand with a revoluble guide fin in the middle of the upper feed roll, and mechanisms for driving both sets of rolls.

2. In a tube-welding machine, the combination of a pair of vertical shafts, grooved pressure rolls on said shafts, transverse adjusting means for the shafts, and transversely spaced fulcrums for the shafts whereon the shafts can swing in a vertical transverse plane, whereby the pressure is applied principally to the upper part of the tube.

3. In a tube-welding machine, the combination with means for heating the seam edges of a tube to a welding temperature, of means for holding and compressing the tube when the edges have been thus heated comprising grooved pressure rolls on vertical shafts, transverse adjusting means acting upon both shafts, and transversely spaced fulcrums for the shafts whereon the shafts can swing in a vertical transverse plane.

4. In a tube-welding machine, the combination of a pair of vertical shafts, rolls on said shafts, transversely spaced pivots whereon said roll shafts can swing relatively to each other, in a vertical transverse plane, means for controlling the angular relation between the shafts, and means for driving said angularly movable shafts.

5. In a tube-welding machine, the combination of a pair of vertical shafts, rolls on said shafts, lower bearings for the shafts, spaced pivots for said bearings whereby the roll shafts can swing relatively to each other in a vertical transverse plane, means for controlling the angular relation between the shafts, and means for adjusting the shafts vertically in their bearings.

6. In a tube-welding machine, the combination of a pair of vertical shafts, rolls on said shafts, lower bearings for the shafts, spaced pivots for said bearings whereby the roll shafts can swing relatively to each other, means for controlling the angular relation between the shafts, means for adjusting the shafts vertically in their bearings, and means for driving the tiltable and vertically adjustable shafts.

7. In a tube-welding machine, the combination of a pair of vertical shafts, rolls on said shafts, lower bearings for the shafts, spaced pivots for said bearings whereby the roll shafts can swing relatively to each other, means for controlling the angular relation between the shafts, means for adjusting the shafts vertically in their bearings, gears held to said bearings and having slidable driving engagement with said shafts, and driving gears on a transverse axis cooperative with the gears on the pivoted bearings.

8. In a tube-welding machine, the combination with a welder for fusing the traveling seam, of a pair of grooved rollers on vertical shafts, between which the tube passes and means for independently and relatively raising and lowering said shafts to counteract misalinement of the edges of the seam and cause them to be presented in proper transverse relation to the welder.

9. In a tube-welding machine of the character described, the longitudinally shiftable feed roll stand, upper and lower vertically-adjustable driven shafts carried by the stand, feed rolls on the ends of said shafts, a guide fin in the upper feed roll, upper and lower arms pivotally supported on the stand upon forward axes, and bearings on the free ends of said arms for the portions of said shafts adjacent the rolls.

10. In a tube-welding machine, the combination with a frame and rolls therein on vertical axes, between which the tube is passed, of a pivot on the frame below the rolls, an arm upstanding on said pivot to swing forwardly and rearwardly in a longitudinal plane and adapted to remain in any position, and a torch-holder carried by the upper part of the arm and adjustable thereon.

11. In tube-welding apparatus, a series of holding devices through which the tube passes, and means for impinging the heat of an autogenous welding flame upon the top of the tube in advance of an intermediate point of holding, the holding devices being in such relation as to produce a bow in the traveling tube beneath the flame sufficient to neutralize longitudinal expansion due to heat.

12. The method of welding longitudinally seamed tubing, which comprises fusing the traveling seam by an autogenous welding flame while holding the tube at a series of points, the seam being fused in advance of an intermediate holding point, and imposing a bow upon the tube in advance of such point and including the region of fusion, exceeding the bowing which would result from expansion due to heat.

13. The method of welding longitudinally seamed tubing, which comprises fusing the traveling seam in advance of a pair of vertical axis holding rolls, and causing the tube to fulcrum upon the lower parts of said rolls and to arch in advance of them beneath the flame, thereby neutralizing longitudinal expansion, transversely flattening the top of the tube at the welding region and causing it to be gathered in by the tops of the rolls.

14. Tube-welding apparatus comprising devices through which the tube is passed and by which it is held and guided at a series of points spaced lengthwise thereof, and means for applying welding heat to the seam edges at a region in advance of an intermediate point of holding, the holding devices being in such relation as to produce a bow in the traveling tube at said region sufficient to neutralize the longitudinal expansion due to heat.

15. The method of welding longitudinally seamed tubing, which comprises applying welding heat to the edges of the traveling tube while holding the tube at a series of points, the seam being thus heated at a region in advance of an intermediate holding point, and imposing a bow upon the tube at said region, exceeding the bowing which would result from expansion due to heat.

JAMES L. ANDERSON.